United States Patent [19]

Ueda et al.

[11] 4,420,501

[45] Dec. 13, 1983

[54] METHOD OF FORMING COLORED OR CONDUCTIVE COATING LAYER ON GLASS SHEET

[75] Inventors: Kazuo Ueda; Yoshio Horio, both of Matsusaka; Toshiyuki Kanno, Tokyo; Yoshio Abe, Iwatsuki, all of Japan

[73] Assignee: Central Glass Company, Limited, Ube, Japan

[21] Appl. No.: 340,709

[22] Filed: Jan. 19, 1982

[30] Foreign Application Priority Data

Jan. 20, 1981 [JP] Japan .................................. 56-5980

[51] Int. Cl.³ .............................................. B05D 3/06
[52] U.S. Cl. .................................. 427/54.1; 252/512; 427/374.4; 427/376.2; 427/419.2
[58] Field of Search ................ 427/54.1, 58, 271, 279, 427/287, 126.2, 376.2, 376.3, 374.4, 374.2, 419.6, 380, 419.4, 419.2, 419.1, 419.3; 252/512

[56] References Cited

U.S. PATENT DOCUMENTS

| | | | |
|---|---|---|---|
| 3,590,468 | 7/1971 | Buck | 427/376.3 |
| 3,663,276 | 5/1972 | Allington et al. | 427/376.2 |
| 3,677,791 | 7/1972 | Palac | 427/54.1 |
| 3,772,075 | 11/1973 | Tarnopol et al. | 427/376.2 |
| 3,784,407 | 1/1974 | Shiio et al. | 427/376.3 |
| 3,907,656 | 9/1975 | de Souza | 427/54.1 |
| 4,172,922 | 10/1979 | Merz et al. | 427/376.3 |
| 4,312,896 | 1/1982 | Armstrong | 427/376.3 |

*Primary Examiner*—Sadie L. Childs
*Attorney, Agent, or Firm*—Fleit, Jacobson, Cohn & Price

[57] ABSTRACT

A method of forming a colored and/or electrically conductive coating layer on a glass sheet by applying a paint containing an inorganic pigment and/or a metal powder together with a powdered glass frit and an organic liquid binder onto the glass sheet, by screen-printing for instance, so as to form a paint layer on the glass sheet surface, rendering the paint layer hard and untacky and thereafter firing the paint-applied glass sheet so as to melt the glass frit contained in the paint. The organic liquid binder comprises at least one acrylate which is selected from monofunctional acrylates and bifunctional acrylates and is polymerizable by radiation of ultraviolet rays. Hardening of the paint layer is accomplished by ultraviolet radiation of very short duration, and the polymerized acrylate can be completely burnt out at the firing step without leaving unburnt carbon which is detrimental to the coating layer.

9 Claims, No Drawings

METHOD OF FORMING COLORED OR CONDUCTIVE COATING LAYER ON GLASS SHEET

BACKGROUND OF THE INVENTION

This invention relates to a method of forming a colored or electrically conductive coating layer on a glass sheet by using a paste or paint containing an inorganic pigment or a metal powder together with a powdered glass and an organic binder.

It is conventional to form a colored coating layer on a glass sheet by applying a paste or paint prepared by dispersing an inorganic pigment and a finely powdered glass frit of a relatively low melting temperature in a mixed solution of an organic binder such as ethyl cellulose and an organic solvent such as pine oil or terpineol onto a surface of the glass sheet, usually by utilizing the technique of screen-printing, so as to form a paint layer of a suitable thickness on the glass surface, drying the printed paint layer and firing the paint-applid glass sheet to fuse the glass frit contained in the paint layer. An electrically conductive coating layer also can be formed by the same method by using a paint containing a suitable metal powder in place of the aforementioned pigment. If desired, a colored and conductive coating layer can be formed by using a paint containing both a pigment and a conducting metal powder in an adequated proportion.

In industrial practice of this coating method, drying of the printed paint layer is indispensable in order to facilitate handling of the paint-applied glass sheet before firing. As a matter of inconvenience, however, it takes a considerably long period of time to complete the drying though it is performed at an elevated temperature, because a solvent having a relatively high boiling point is used in the paint with a view to accomplishing printing of the paint on the glass sheet with accurate control of the thickness of the printed paint layer and without suffering from defects in the printed paint layer such as blurring. Particularly in the case of a multi-layer printing for the purpose of forming a multicolored coating layer, the accompaniment of a drying procedure to each printing procedure becomes a significant cause of low productivity of the coating process.

In view of such inconveniences, recently it has been proposed and already put into practice to use a photosensitive polymer as the organic binder in a paint used in the above described coating method. More particularly, use is made of an ultraviolet-sensitive unsaturated polymer which can rapidly be cured by radiation of ultraviolet rays. In the coating method using a paint containing such an unsaturated polymer as binder, exposure of the printed paint layer to ultraviolet rays soon results in cross linking of the unsaturated polymer in the paint layer so that the paint layer becomes hard and untacky. Therefore, the object of drying of the printed paint layer can be accomplished in a greatly shortened period of time.

According to our recognition, however, the use of a paint containing an ultraviolet-sensitive unsaturated polymer tends to result in insufficient strength of adhesion of the colored or conductive coating layer to the glass sheet. In the coating method of the described type, it is necessary that the organic binder contained in the paint, whether a familiar one such as ethyl cellulose or an ultraviolet-sensitive unsaturated polymer, be completely burnt out during the firing procedure. In the case of using the unsaturated polymer, however, the cross linking of the polymer caused by the radiation of ultraviolet rays makes it difficult to completely burn and gasify this polymer in the cured state, and therefore the coating layer after the firing and cooling tends to retain some carbon, which adversely influences the strength of adhesion between the coating layer and the glass sheet and, in an extreme case, becomes a cause of peeling of the coating layer from the glass sheet. Besides, the carbon retained in the coating layer produces an undesirable variation in the color tone of the coating layer, and this becomes a serious matter of disadvantage in the case of a colored coating layer.

SUMMARY OF THE INVENTION

It is an object of the present invention to provide an improved method of forming a colored or electrically conductive coating layer on a glass sheet, which method is analogous to conventional methods in using a paste or paint but, nevertheless, gives a coating layer uniformly beautiful in appearance and sufficiently high in the strength of adhesion to the glass sheet, and in which method it is possible to render a paint layer formed on the glass sheet hard and untacky in a very short period of time.

A method according to the invention has the steps of applying a paint which contains either an inorganic pigment or a metal powder, or both, together with a powdered glass and an organic liquid binder onto a major surface of a glass sheet so as to form a paint layer, rendering the paint layer hard and untacky, thereafter firing the paint-applied glass sheet so as to melt the glass contained in the paint layer and burn out the organic component of the paint layer, and cooling the fired glass sheet. As the essential feature of the invention, the paint contains at least one acrylate which is polymerizable by radiation of ultraviolet rays and is selected from monofunctional acrylates and bifunctional acrylates as the organic liquid binder, and accordingly the paint layer formed on the glass sheet is rendered hard and untacky by ultraviolet radiation.

An acrylate employed in the present invention has a room temperature viscosity suitable for a binder in a paint or paste for use in printing, particularly in screen-printing, and readily polymerizes to become solid by ultraviolet radiation of a very short duration. As a distinct advantage of using an acrylate of this class, the polymer formed in a printed paste layer by ultraviolet radiation can be completely decomposed and burnt without leaving solid carbon during a firing process adequate to fusion of the glass frit contained in the paint layer. If a trifunctional or still higher polyfunctional acrylate is used as an ultraviolet-sensitive binder in the same method, exposure of the printed paste layer to ultraviolet rays results in formation of a polymer very high in cross linking density, and therefore it becomes almost inevitable that some carbon remains unburnt in the coating layer obtained through the firing process to become a cause of insufficiency of the strength of adhesion between the coating layer and the glass sheet, discoloration of the coating layer and/or degradation of the surface smoothness of the coating layer. In other words, it is impossible to obviate the disadvantages of using an ultraviolet-sensitive unsaturated polymer when a trifunctional or still higher polyfunctional monomer is used instead.

In the method according to the invention, hardening of the paint layer formed on the glass sheet can be accomplished in a very short time, and carbon does not remain in the fired coating layer. Therefore, a coating layer formed by this method is excellent in both the strength of its adhesion to the glass sheet and the smoothness of its surface and, particularly in the case of a colored coating layer, does not suffer from discoloration or a variation in the color tone.

As will be understood, either a colored coating layer or an electrically conductive coating layer can be formed by a method according to the invention with no difference in fundamentals, although a pigment is used for a colored coating layer whereas a metal powder is used for a conductive coating layer. If desired, a colored and electrically conductive coating layer can be formed by jointly using a relatively large amount of a metal powder and a relatively small amount of a pigment in a paint. Also it is possible to form a polychrome coating by forming a laminate of a plurality of paint layers different in color, or to form a double-layer coating constituted of a colored layer and an electrically conductive layer.

DESCRIPTION OF THE PREFERRED EMBODIMENTS

A paint for use in a method according to the invention contains an inorganic pigment where it is intended to form a colored coating layer but, instead, a metal powder when forming an electrically conductive coating layer. Also it is possible to form a colored and conductive coating layer by using a paint containing a relatively large amount of a metal powder and a relatively small amount of pigment. As is usual, a pigment refers to a finely powdered metal oxide or metal having a desired color, or a mixture of two or more kinds of finely powdered metal oxides and/or metals. Typical examples of metal powders useful as conducting materials are silver powder and copper powder.

A finely powdered glass frit contained in the paste begins to serve as an inorganic binder when fused at the firing step in the coating method of the invention and also serves as an adhesive during its solidification at the subsequent cooling stage. It is suitable to use a glass frit that melts at a relatively low temperature, and it is necessary that the melting temperature of the glass frit is lower than that of the glass sheet on which the coating layer is formed. If desired use may be made of a colored glass frit.

As explained hereinbefore, the paint is required to contain an acrylate that is polymerizable by ultraviolet radiation and is selected from monofunctional acrylates and bifunctional acrylates. Preferred examples of useful monofunctional acrylates are lauryl methacrylate and 2-hydroxyethylene acrylate, and preferred examples of useful bifunctional acrylates are diethyleneglycol diacrylate, tetraethyleneglycol diacrylate and 1,6-hexadiol diacrylate. If desired, it is possible to jointly use two or more kinds of monofunctional and/or bifunctional acrylates. In any case it is preferred that the total content of the monofunctional and/or bifunctional acrylate(s) in the paint is in the range from 10 to 30% by weight of the paint. The content of the acrylate(s) in the paint is determined primarily with consideration of a desired viscosity of the paint.

Since monofunctional and bifunctional acrylates for use in a method according to the invention are liquid at room temperature, it is not a requisite to use an additional organic liquid in preparing a paint for use in this method. However, it is optional to additionally use a familiar organic liquid medium such as pine oil, turpentine oil, terpineol or butanol either singularly or together with an organic viscosity-adjusting agent such as ethyl cellulose or vinyl acetate for the purpose of adjusting the viscosity of the paint so as to become suited to a selected method of applying the paint to the glass sheet, screen-printing for instance. Also it is optional to add a certain compound that serves as a sensitizer for the ultraviolet-sensitive acrylate employed in the paint.

The exposure of a paint layer formed on the glass sheet to ultraviolet radiation is terminated when the paint layer become sufficiently hard and untacky, and the subsequent firing step can be performed generally similarly to the firing step in a conventional coating method of the analogous type.

The following nonlimitative examples are presented to illustrate a method according to the invention.

EXAMPLE 1

A color paint in the form of paste was prepared by mixing 19 parts by weight of lauryl methacrylate, 16 parts by weight of an inorganic pigment which was a mixture of finely powdered $Cr_2O_3$, $CoO$ and $NiO$, 53 parts by weight of a glass frit of a relatively low melting temperature (a glass containing $SiO_2$, $PbO$ and $B_2O_3$ as its principal components), 0.5 parts by weight of ethyl cellulose and 11.5 parts by weight of pine oil and kneading the mixture.

This paste was printed on a major surface of a transparent glass sheet by utilizing the technique of screen-printing such that the thickness of the printed paint layer became 50 $\mu$m. Soon after printing, the paint layer on the glass sheet was exposed to radiation of ultraviolet rays from an air-cooled high-pressure mercury vapor lamp, which was operated at an input power of 5.6 KW, lamp voltage of 920 V and lamp current of 7.5 A, for about 2 seconds. This ultraviolet radiation caused the paint layer to harden and become untacky. After this treatment, the paint-applied glass sheet was passed through a tunnel furnace in which the maximum temperature was set at 780° C. in order to fuse the glass frit powder contained in the hardened paint layer and burn out the organic components of the paint layer. Thereafter the glass sheet was let cool down to room temperature, and it was confirmed that the glass sheet was coated with a colored glass layer which had a thickness of about 30 $\mu$m and excellent in both the smoothness of the surface and the strength of adhesion to the glass sheet.

EXAMPLE 2

The color paint prepared in Example 1 was printed on a major surface of a transparent glass sheet by screen-printing to form a 50 $\mu$m thick layer of the paint, and the paint layer was hardened by radiation of ultraviolet rays in the same manner as in Example 1.

A conductive paint in the form of paste was prepared by mixing 29 parts by weight of lauryl methacrylate, 53.2 parts by weight of a fine powder of silver, 1.1 parts by weight of the powdered glass frit mentioned in Example 1, 0.5 parts by weight of ethyl cellulose and 16.2 parts by weight of $\alpha$-terpineol, and kneading the mixture. This conductive paint was applied onto the surface of the already hardened color paint layer by screen-printing so as to form a 12 $\mu$m thick layer of the conductive paint. Then the conductive paint layer was exposed to ultraviolet rays for 2 seconds under the radiation condition mentioned in Example 1. This treatment caused the conductive paint layer to harden and become untacky.

The glass sheet provided with the thus laminated paint layers was passed through the tunnel furnace mentioned in Example 1 in order to accomplish simultaneous firing of the laminated two paint layers and thereafter let cool down to room temperature. As the result, the glass sheet was provided with a coating layer consisting of a transparent and conductive upper surface region and a colored base region. This coating layer was excellent in the smoothness of the surface and very strong in its adhesion to the glass sheet and also in the adhesion between the conductive upper region and the colored base region.

What is claimed is:

1. A method of forming a colored coating layer on a glass sheet, comprising the steps of:
applying a paint comprising an inorganic pigment, a powdered glass and an organic liquid binder onto a major surface of the glass sheet so as to form a paint layer on said surface of the glass sheet, said liquid binder consisting essentially of at least one acrylate selected from the group consisting of monofunctional acrylates polymerizable by radiation of ultraviolet rays and bifunctional acrylates polymerizable by radiation of ultraviolet rays, said at least one acrylate having a room temperature viscosity suitable for a binder in a paint or paste for use in printing and capable of being completely decomposed without leaving solid carbon during a firing process adequate to fuse said glass powder of said paint;
rendering said paint layer hard and untacky by radiation of ultraviolet rays;
firing the glass sheet after hardening of said paint layer so as to melt said glass contained in the hardened paint layer and burn out the organic component of the hardened paint layer; and
cooling the fired glass sheet.

2. A method of forming an electrically conductive coating layer on a glass sheet, comprising the steps of:
applying a paint comprising a metal powder, a powdered glass and an organic liquid binder onto a major surface of the glass sheet so as to form a paint layer on said surface of the glass sheet, said liquid binder consisting essentially of at least one acrylate selected from the group consisting of monofunctional acrylates polymerizabale by radiation of ultraviolet rays and bifunctional acrylates polymerizable by radiation of ultraviolet rays, said at least one acrylate having a room temperature viscosity suitable for a binder in a paint or paste for use in printing and capable of being completely decomposed without leaving solid carbon during a firing process adequate to fuse said glass powder of said paint;
rendering said paint layer hard and untacky by radiation of ultraviolet rays;
firing the glass sheet after hardening of said paint layer so as to melt said glass contained in the hardened paint layer and burn out the organic component of the hardened paint layer; and
cooling the fired glass sheet.

3. A method according to claim 1 or 2, wherein said at least one acrylate is selected from the group consisting of lauryl methacrylate, 2-hydroxyethylene acrylate, diethyleneglycol diacrylate, tetraethyleneglycol diacrylate and 1,6-hexadiol diacrylate.

4. A method according to claim 3, wherein the content of said at least one acrylate in said paint is in the range from 10 to 30% by weight of said paint.

5. A method according to claim 3, wherein said paint further comprises an organic liquid material which is insensitive to ultraviolet rays and serves as a viscosity adjusting agent.

6. A method according to claim 5, wherein said organic liquid material contains an organic polymeric substance dissolved therein.

7. A method according to claim 1 or 2, wherein said paint is applied onto said surface of the glass sheet by screen-printing.

8. A method of forming a colored coating layer on a glass sheet, comprising the steps of:
applying a first paint comprising a first inorganic pigment, a powdered glass and an organic liquid binder onto a major surface of the glass sheet so as to form a first paint layer on said surface of the glass sheet, said liquid binder consisting essentially of at least one acrylate selected from the group consisting of monofunctional acrylates polymerizable by radiation of ultraviolet rays and bifunctional acrylates polymerizable by radiation of ultraviolet rays, said at least one acrylate having a room temperature viscosity suitable for a binder in a paint or paste for use in printing and capable of being completely decomposed without leaving solid carbon during a firing process adequate to fuse said glass powder of said paint;
rendering said first paint layer hard and untacky by radiation of ultraviolet rays;
applying a second paint comprising a second inorganic pigment, a powdered glass and an organic liquid binder which consists essentially of said at least one acrylate onto the outer surface of the hardened first paint layer so as to form a second paint layer on said surface of the hardened first paint layer;
rendering said second paint layer hard and untacky by radiation of ultraviolet rays;
firing the glass sheet after hardening of said second paint layer so as to melt said glass contained in each of the hardened first and second paint layers and burn out the organic components of the hardened first and second paint layers; and
cooling the fired glass sheet.

9. A method of forming a colored coating and electrically conductive coating layer on a glass sheet, comprising the steps of:
applying a first paint comprising a first inorganic pigment, a powdered glass and an organic liquid binder onto a major surface of the glass sheet so as to form a first paint layer on said surface of the glass sheet, said liquid binder consisting essentially of at least one acrylate selected from the group consisting of monofunctional acrylates polymerizable by radiation of ultraviolet rays and bifunctional acrylates polymerizable by radiation of ultraviolet rays, said at least one acrylate having a room temperature viscosity suitable for a binder in a paint or paste for use in printing and capable of being completely decomposed without leaving solid carbon during a firing process adequate to fuse said glass powder of said paint;

rendering said first paint layer hard and untacky by radiation of ultraviolet rays;

applying a second paint comprising a powdered glass and an organic liquid binder which consists essentially of said at least one acrylate onto the outer surface of the hardened first paint layer so as to form a second paint layer on said surface of the hardened first paint layer;

rendering said second paint layer hard and untacky by radiation of ultraviolet rays;

firing the glass sheet after hardening of said second paint layer so as to melt said glass contained in each of the hardened first and second paint layers and burn out the organic components of the hardened first and second paint layers; and cooling the fired glass sheet.

* * * * *